(12) United States Patent
Liu

(10) Patent No.: US 7,922,367 B2
(45) Date of Patent: Apr. 12, 2011

(54) OPTICAL ELEMENT AND BACKLIGHT MODULE HAVING THE SAME

(75) Inventor: Ying Liu, New Territories (CN)

(73) Assignee: Hong Kong Applied Science and Technology Research Institute Co. Ltd., Shatin, New Territories, Hong Kong (CN)

( * ) Notice: Subject to any disclaimer, the term of this patent is extended or adjusted under 35 U.S.C. 154(b) by 250 days.

(21) Appl. No.: 12/188,596

(22) Filed: Aug. 8, 2008

(65) Prior Publication Data

US 2009/0052173 A1  Feb. 26, 2009

(30) Foreign Application Priority Data

Aug. 20, 2007 (CN) .......................... 2007 1 0142040

(51) Int. Cl.
*F21V 5/00* (2006.01)
(52) U.S. Cl. ......... 362/308; 362/612; 362/338; 362/555
(58) Field of Classification Search .................. 362/307, 362/308, 555, 558, 612, 327, 338, 310; 257/98
See application file for complete search history.

(56) References Cited

U.S. PATENT DOCUMENTS

| | | | |
|---|---|---|---|
| 7,224,501 B2 * | 5/2007 | Kojima ............................ 359/16 |
| 7,224,537 B2 * | 5/2007 | Choi ............................. 359/707 |
| 7,549,769 B2 * | 6/2009 | Kim et al. ..................... 362/241 |
| 7,621,657 B2 * | 11/2009 | Ohkawa ................... 362/311.01 |
| 7,659,552 B2 * | 2/2010 | Chang .............................. 257/98 |
| 2003/0235050 A1 | 12/2003 | West et al. |
| 2006/0076568 A1 | 4/2006 | Keller et al. |
| 2006/0105485 A1* | 5/2006 | Basin et al. ..................... 438/27 |

FOREIGN PATENT DOCUMENTS

TW          565951 B      12/2003

* cited by examiner

*Primary Examiner* — Jong-Suk (James) Lee
*Assistant Examiner* — Peggy A. Neils
(74) *Attorney, Agent, or Firm* — Merchant & Gould P.C.

(57) ABSTRACT

An optical element, a light-emitting component and a direct-lit backlight module having the optical element are provided. The optical element includes a bottom surface, at least one side refractive surface for refracting one part of a light beam incident from the bottom surface, and an upper refractive surface for refracting the other part of the light beam incident from the bottom surface. A maximum included angle formed between the light beam incident from the bottom surface and to be irradiated onto the side refractive surface and the bottom surface is a first angle (α). An included angle formed between a light beam coming out from at least one side refractive surface and the bottom surface is smaller than or equal to the first angle. A maximum included angle formed between the light beam incident from the bottom surface and to be irradiated onto the upper refractive surface and a central axis of the optical element is a second angle (β). An included angle formed between the light beam coming out from the upper refractive surface and the central axis of the optical element is greater than or equal to the second angle.

20 Claims, 4 Drawing Sheets

OPTICAL ELEMENT AND BACKLIGHT MODULE HAVING THE SAME

FIELD OF THE INVENTION

The present invention relates to an optical element, and more particularly to an optical element applicable to a light-emitting component and a backlight module.

DESCRIPTION OF THE PRIOR ART

A backlight module is a basic component of an LCD. Currently used backlight modules may be substantially classified into side-lit backlight modules and direct-lit backlight modules.

The conventional side-lit backlight module has light-emitting diodes arranged in rows at two sides thereof, and a light guide is provided in a visible range of a display, so that light beams produced by the light-emitting diodes are uniformly radiated out of the backlight module through the light guide. U.S. Pat. No. 6,679,621 and US Patent Publication No. 20060076568 both provide an optical element which covers the light-emitting diodes and is embedded into the two sides of the light guide. The optical element is equivalent to a lens in function, and is mainly used to divert the light beams emitted from the light-emitting diodes to make the lights come out in parallel from the two sides of the optical element. Furthermore, a reflective paint is coated on an upper surface of the optical element, so that no light beams will come out from the top of the optical element. Such a design may reduce the thickness of the side-lit backlight module and ensure that all light beams emitted from the light-emitting diodes enter the light guides.

The direct-lit backlight module directly provides multiple light-emitting diodes in the visible range of the display, so the light guide is unnecessary. However, since a semi-energy angle of each light-emitting diode is limited to ±60°, in the direct-lit backlight module, a light-mixing area having a certain spatial distance must be reserved above the light-emitting diodes, so that the light beams emitted from any two adjacent light-emitting diodes overlap each other, thereby achieving uniform illumination.

The aforementioned two backlight modules have advantages and disadvantages. For example, the side-lit backlight module is heavy and has a low optical efficiency, and the direct-lit backlight module is thick or uses more light-emitting diodes. Furthermore, when one of the light-emitting diodes is damaged, the brightness of the direct-lit backlight module is not uniform.

SUMMARY OF THE INVENTION

In view of the above, an objective of the present invention is to provide an optical element to increase an exit angle of light beams of light-emitting diodes or other light sources covered by the optical element.

Another objective of the present invention is to provide a light-emitting optical component for a direct-lit backlight module, so as to reduce the number of light-emitting diodes of the direct-lit backlight module or reduce the thickness of a light-mixing area of the backlight module.

In an embodiment of the present invention, an optical element is provided which includes a bottom surface; at least one side refractive surface for refracting one part of a light beam incident from the bottom surface; and an upper refractive surface, for refracting the other part of the light beam incident from the bottom surface. A maximum included angle formed between the light beam incident from the bottom surface and to be irradiated onto the side refractive surface and the bottom surface is a first angle ($\alpha$). An included angle formed between a light beam coming out from at least one side refractive surface and the bottom surface is smaller than or equal to the first angle. A maximum included angle formed between the light beam incident from the bottom surface and to be irradiated onto the upper refractive surface and a central axis of the optical element is a second angle ($\beta$). An included angle formed between the light beam coming out from the upper refractive surface and a central axis of the optical element is greater than or equal to the second angle.

In another embodiment of the present invention, a light-emitting component is provided which includes a light source; and an optical element. The optical element comprises a bottom surface; at least one side refractive surface, for refracting one part of a light beam incident from the bottom surface; and an upper refractive surface, for refracting the other part of the light beam incident from the bottom surface. A maximum included angle formed between the light beam incident from the bottom surface and to be irradiated onto the side refractive surface and the bottom surface is a first angle ($\alpha$). An included angle formed between a light beam coming out from at least one side refractive surface and the bottom surface is smaller than or equal to the first angle. A maximum included angle formed between the light beam incident from the bottom surface and to be irradiated onto the upper refractive surface and a central axis of the optical element is a second angle ($\beta$), and an included angle formed between the light beam coming out from the upper refractive surface and a central axis of the optical element is greater than or equal to the second angle.

In another embodiment of the present invention, a direct-lit backlight module is provided which includes a plurality of light-emitting components. Each of the light-emitting components includes a light source and an optical element. Each of the optical elements includes a bottom surface; at least one side refractive surface, for refracting one part of a light beam incident from the bottom surface; and an upper refractive surface, for refracting the other part of the light beam incident from the bottom surface. A maximum included angle formed between the light beam incident from the bottom surface and to be irradiated onto the side refractive surface and the bottom surface is a first angle ($\alpha$). An included angle formed between a light beam coming out from at least one side refractive surface and the bottom surface is smaller than or equal to the first angle. A maximum included angle formed between the light beam incident from the bottom surface and to be irradiated onto the upper refractive surface and a central axis of the optical element is a second angle ($\beta$). An included angle formed between the light beam coming out from the upper refractive surface and a central axis of the optical element is greater than or equal to the second angle.

Since the optical element provided by the present invention may efficiently increase the exit angle of light beams of light-emitting diodes or other light sources covered by the optical element, the light-emitting component or the direct-lit backlight module using the optical element of the present invention can reduce the number of light-emitting diodes or other light sources (i.e., reduce the distribution density of the light-emitting diodes or other light sources). Furthermore, the lower the distribution density of the light-emitting diodes in the conventional backlight module is, the thicker the backlight module is required, so as to increase the light-mixing area and thoroughly mix the light beams. However, if the direct-lit backlight module employing the optical element of the present invention is used, since the exit angle of light beams of the light-emitting diodes or other light sources is increased efficiently, the number of light-emitting diodes or other light sources may be reduced, or the thickness of the light-mixing area is reduced, thereby obtaining a thinner backlight module.

The present invention will be described with reference to the drawings below. Based on the description and the claims of the present invention, other objectives and achievements of the present invention become obvious and the present invention may be fully understood.

DETAILED DESCRIPTION

Figure 1:
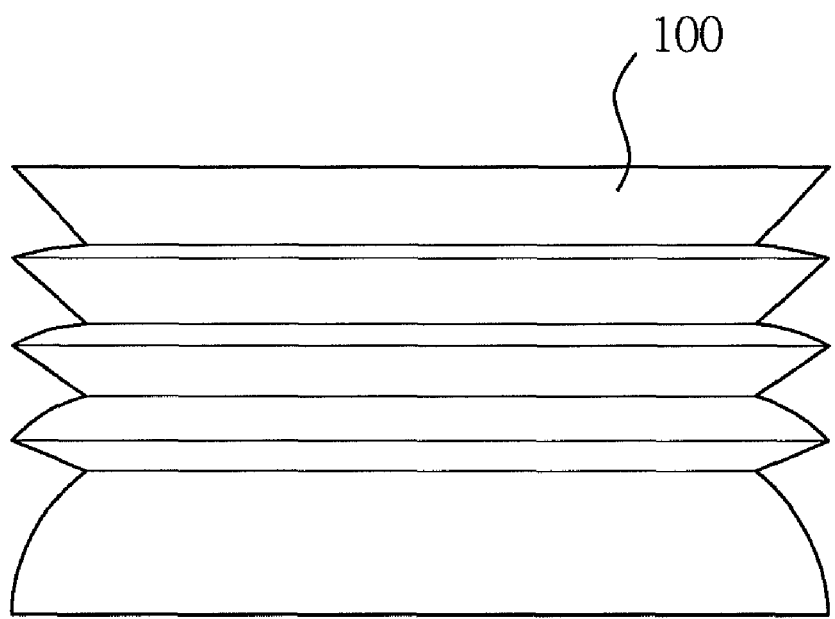
FIG. 1 is a plan view of an optical element according to the first embodiment of the present invention.
Figure 2:
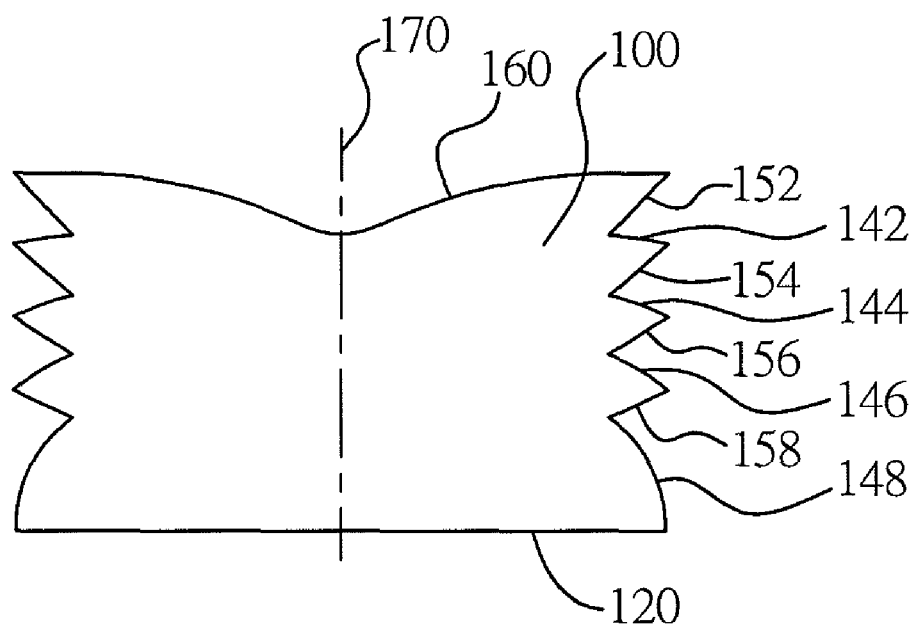
FIG. 2 is a cross-sectional view of the optical element in FIG. 1.

Referring to FIGS. 1 and 2, a plan view and a cross-sectional view of the optical element 100 (for example, a lens) in the first embodiment of the present invention are shown. As shown in FIG. 2, the optical element 100 includes a bottom surface 120, at least one side refractive surface having a smooth aspherical surface with downward notches (in this embodiment, there are four side refractive surfaces 142, 144, 146, and 148), an upper refractive surface 160, and junction surfaces 152, 154, 156, and 158 connecting the side refractive surface 142 and the upper refractive surface 160 or two adjacent side refractive surfaces. A dashed line 170 is a central axis of the optical element 100 and is perpendicular to the bottom surface 120. Furthermore, an extension plane of any junction surface passes through the bottom surface. The extension plane of any junction surface passes preferably through the center of the bottom surface. It should be noted that although the optical element 100 in FIG. 2 has four side refractive surfaces at the left and right sides, respectively, the number of the side refractive surfaces of the optical element 100 of the present invention is an integer greater than or equal to 1. In this embodiment, the side refractive surface at the left and right sides actually is an annular refractive surface symmetrical about the central axis. Furthermore, in this embodiment, the upper refractive surface 160 is a smooth aspherical surface having an upward notch, or a curved surface of another style, and the section thereof consists of a curve with an upward notch and left and right curves with downward notches. However, according to the other embodiment of the present invention, the section of the upper refractive surface may also be a curve having at least three critical points in which the middle critical point is the lowest point of the curve.

Figure 3A:
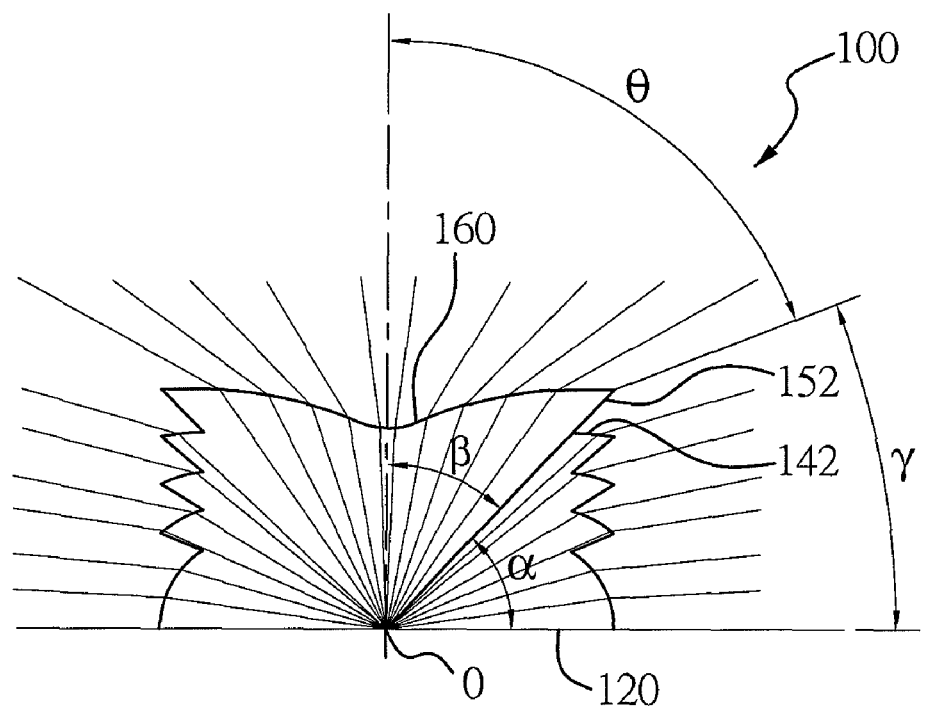
FIGS. 3A and 3B are schematic views showing a light beam passing through the optical element of the present invention.

FIG. 3A is a schematic view showing the light beam passing through the optical element 100. In one embodiment of the present invention, the optical element 100 and a light-emitting diode are assembled into a light-emitting component. However, according to other embodiments of the present invention, other types of light sources instead of the light-emitting diode may also be used to be assembled into a light-emitting component. For example, other light sources may be an incandescent lamp, a phosphor light-emitting device, or another light source. The light-emitting diode may be one or more white light chips, RGB single chips, or RGB chip assembly.

In this embodiment, the extension plane of the junction surface 152 between the upper refractive surface 160 and the side refractive surface 142 is just connected to an intersection point of the central axis and the bottom surface. If the light source is a perfect point light source or a point light source O with a small light-emitting area, and the first angle $\alpha$ is just an included angle formed between the junction surface 152 and the bottom surface 120, it may be assumed that in the light beam incident into the optical element 100 through the bottom surface, if a part of the light beam having the included angle from the bottom surface is greater than $\alpha$, this part of the light beam will be refracted by the upper refractive surface and come out, and if a part of the light beam having the included angle from the bottom surface is smaller or equal to $\alpha$, this part of the light beam will be refracted by the side refractive surface and come out. In this embodiment, a maximum angle formed between the light beam coming out from the side refractive surface and the bottom surface is $\gamma$, where $\gamma$ is smaller than or equal to $\alpha$. Furthermore, the included angle formed between the light beam to be incident on the upper refractive surface and the central axis of the optical element 100 is $\beta$, and a maximum included angle formed between the light beam coming out from the upper refractive surface and the central axis of the optical element 100 is $\theta$, i.e., $\theta$ is between the light beam coming out from the edge of the upper refractive surface 160 and the central axis, and is greater than or equal to the included angle $\beta$.

According to the other embodiments of the present invention, if the extension plane of the junction surface 152 is not connected to the intersection point of the central axis and the bottom surface, $\alpha$ is equal to the included angle formed between the connecting line of the center of the bottom surface of the optical element and the bottom edge of the junction surface 152 and the bottom surface. For example, referring to FIG. 3B, the extension plane of the junction surface 152 in FIG. 3B will not be connected to the intersection point of the central axis and the bottom surface, and the light source 180 is a surface light source or a body light source similar to the surface light source. Likewise, it may be assumed that in the light beam incident into the optical element 100 from the bottom surface, if a part of the light beam having the included angle from the bottom surface is greater than $\alpha$, this part of the light beam will be refracted by the upper refractive surface and come out, and if the part of the light beam having the included angle from the bottom surface is smaller or equal to $\alpha$, this part of the light beam will be refracted by the side refractive surface and come out. A maximum included angle formed between the light beam coming out from the side refractive surface and the bottom surface is $\gamma$, where $\gamma$ is smaller than or equal to $\alpha$. Likewise, the included angle formed between the light beam incident on the upper refractive surface and the central axis of the optical element 100 is $\beta$. A maximum angle formed between the light beam coming out from the upper refractive surface and a central axis of the optical element 100 is $\theta$, i.e., $\theta$ is between the light beam coming out from the edge of the upper refractive surface 160 and the central axis, and is greater than or equal to the included angle $\beta$. To sum up, in both embodiments shown in FIGS. 3A and 3B, the first angle α is the maximum included angle formed between the light beam coming out from the light source and incident on the side refractive surface and the bottom surface 120, and the second angle β is the maximum included angle emitted from the light-emitting surface of the light source and incident on the upper refractive surface and the central axis of the light-emitting component.

Figure 3B:
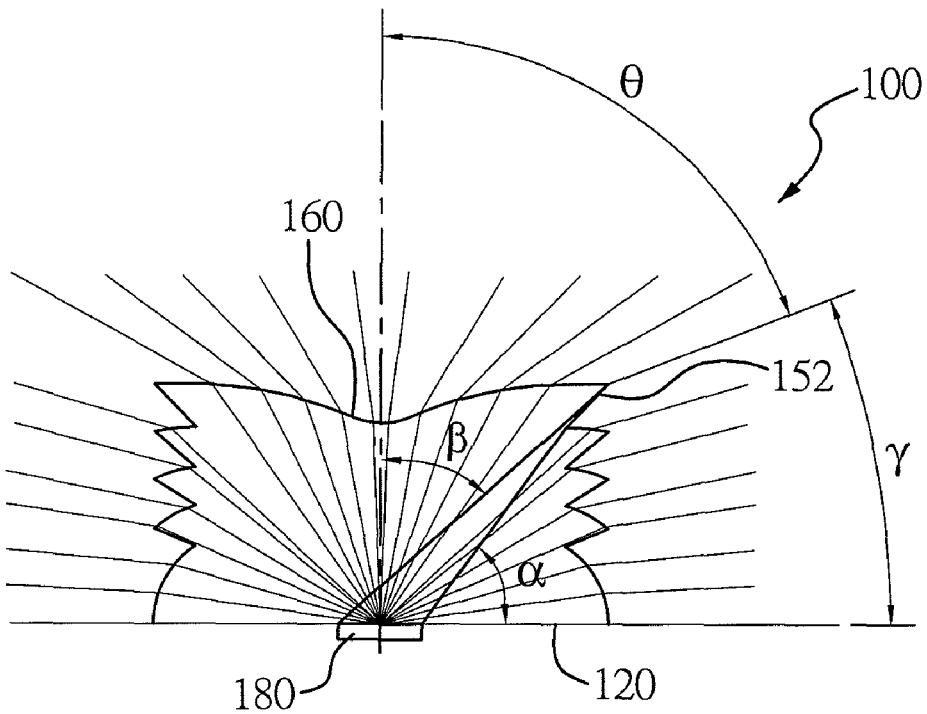

Most of the energy of the light beam emitted by a common light source is usually confined to a certain angle. For example, the half energy angle of the light-emitting diode is about ±60°. The light beam closer to the central axis has a greater energy distribution. However, when a common light source or light-emitting diode is covered by the optical element provided by the present invention, the energy distribution of the light beam will be changed significantly. As shown in FIGS. 3A and 3B, since the light beam coming out from the upper refractive surface is refracted outwardly and diffused, the energy of the light beam aggregated near the central axis is diffused to a wider angle. Furthermore, since the shape of the side refractive surface is a curve with downward notches, the light beam coming out from the side refractive surface will also be close to a direction perpendicular to the central axis. Therefore, the exit angle of the light beam after passing through the optical element 100 is significantly increased, and the energy of the exited light beam is distributed uniformly between 0° and 90° relative to the central axis.

Figure 4:
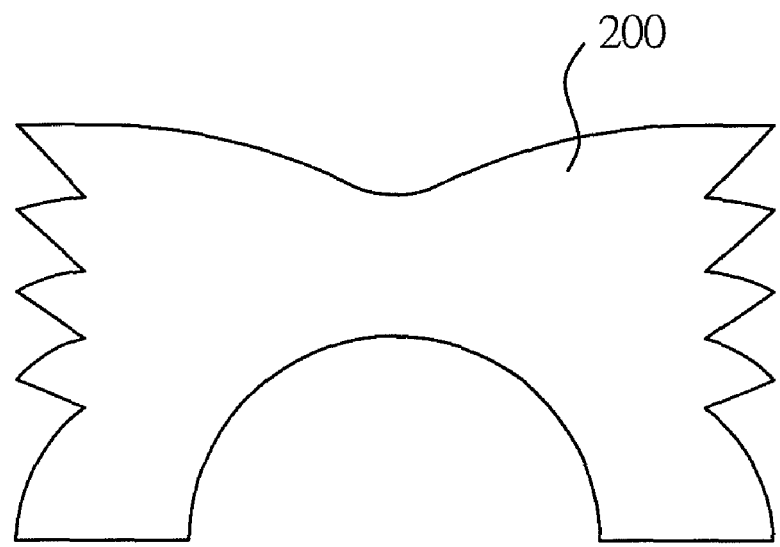
FIG. 4 is a cross-sectional view of an optical element according to the second embodiment of the present invention.

Referring to FIGS. 2 and 4, FIG. 4 is a cross-sectional view of the optical element 200 in the second embodiment of the present invention. Compared with the bottom surface of the optical element 100 being a plane in FIG. 2, the bottom surface of the optical element 200 is a concave surface, so as to accommodate the light-emitting diode 180 or another light source, and the shape of the concave surface may be changed according to the shape of the light source. Furthermore, although the optical elements 100 and 200 in FIGS. 2 and 4 include four side refractive surfaces, the optical element may also have one or more side refractive surfaces according to other embodiments of the present invention.

Figure 5:
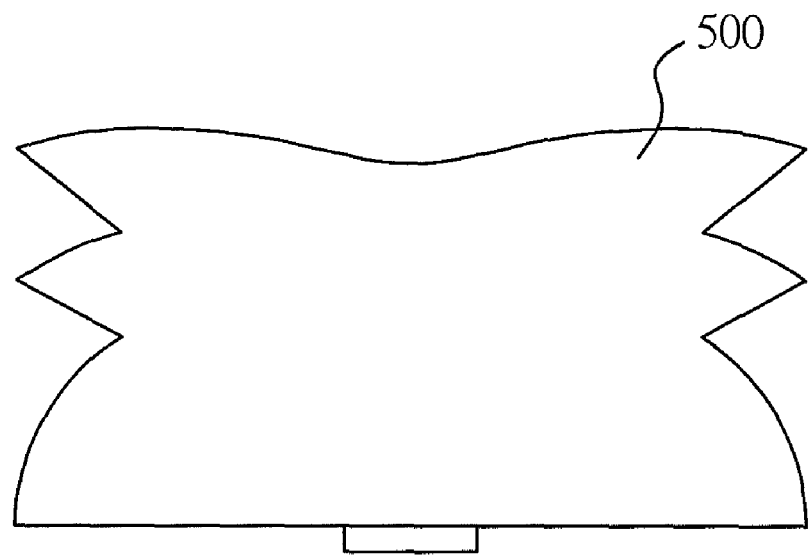
FIG. 5 is a cross-sectional view of an optical element according to the third embodiment of the present invention.

Referring to FIG. 5, a cross-sectional view of the optical element 500 in the third embodiment of the present invention is shown. Compared with the optical element 100 having four side refractive surfaces in FIG. 2, although the optical element 500 merely has two side refractive surfaces, the energy distribution of the exited light beam may also be wider. It should be noted that the wider energy distribution of the light beam may be achieved no matter whether the number of the side refractive surfaces of the optical element of the present invention is an integer greater than or equal to 1.

Figure 6:
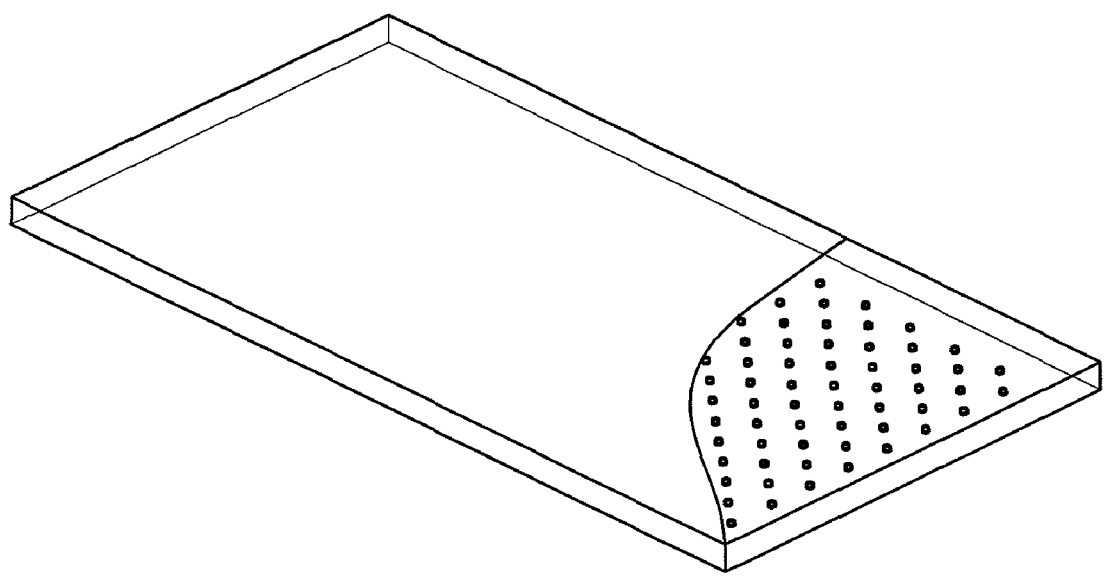
FIG. 6 is a schematic view of an embodiment of the optical element of the present invention when applied in the direct-lit backlight module.
Figure 7:
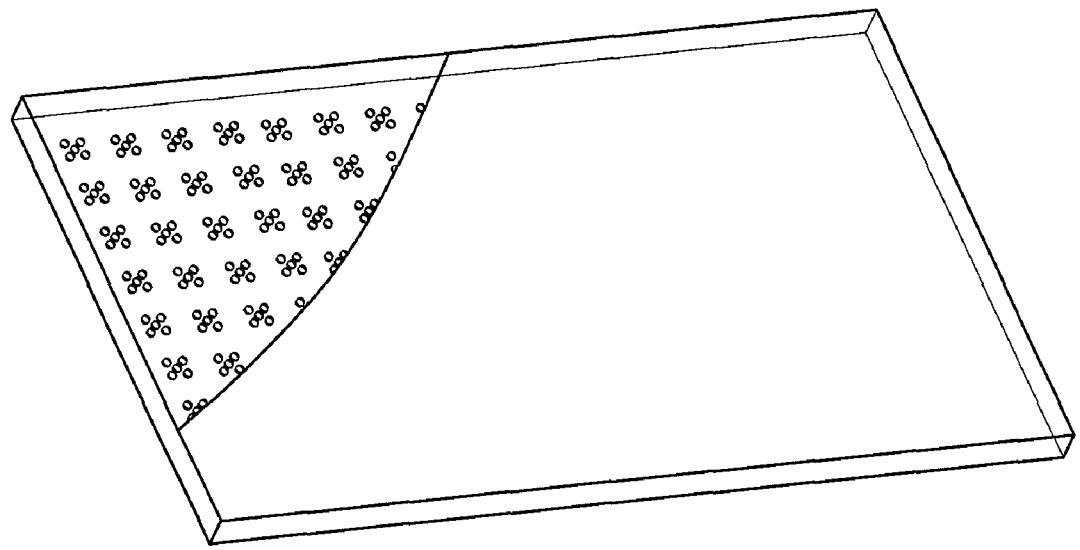
FIG. 7 is a schematic view of the second embodiment of the optical element of the present invention when applied in the direct-lit backlight module.

Referring to FIGS. 6 and 7, schematic views of the light-emitting component (the assembly of the optical element and the light source in the present invention) of the present invention when applied in the direct-lit backlight module are shown, respectively. The light source used in each of the light-emitting components may be a light-emitting diode, an incandescent lamp, a phosphor light-emitting device, or another light source. The light-emitting diode may be one or more white light chips, RGB single chips, or RGB chip assemblies. Since the irradiation area of the light-emitting component in the present invention is wide, compared with the direct-lit backlight module employing the conventional light-emitting component, when the thickness of the light-mixing area is the same, the direct-lit backlight module of the present invention may efficiently reduce the number of light-emitting components. Or, when the distribution density of the light-emitting component remains unchanged, the thickness of the light-mixing area may be efficiently reduced. Furthermore, when one light-emitting component in the backlight module of the present invention cannot be operated normally, the surrounding light-emitting components can provide compensation, so the brightness of the backlight module will not be non-uniform, obviously.

In summary, a light-emitting component may be formed by the assembly of the optical element of the present invention and the light source. The formed light-emitting component may emit light beams uniformly between 0° and ±90° relative to the central axis. Therefore, the light-emitting component of the present invention has a wider irradiation area than the light-emitting component using the same light source, and the energy distribution of the light beam at all angles is more uniform. Furthermore, since the light-emitting component of the present invention has a wide irradiation area, and is lower than the conventional light-emitting component using a hemispherical lens, the direct-lit backlight module using the light-emitting component of the present invention has the advantages of having reduced thickness, using less light-emitting components, and being capable of brightness compensation.

Although the technical contents and features disclosed in the present invention are described as above, those skilled in the art may make variations and modifications without departing from the teaching and disclosure of the present invention. Therefore, the scope of the present invention is not limited to the embodiments which have been disclosed, but includes other variations and modifications not departing from the present invention, which are covered by the claims.

I claim:

1. An optical element, comprising:
    a bottom surface;
    at least one side refractive surface, for refracting one part of a light beam incident from the bottom surface; and
    an upper refractive surface, for refracting the other part of the light beam incident from the bottom surface, wherein the upper refractive surface comprises a smooth aspherical concave surface and the cross section of the upper refractive surface comprises a concave curve and two convex curves at both sides of the concave curve;
    wherein a maximum included angle formed between the light beam incident from the bottom surface and to be irradiated onto the side refractive surface and the bottom surface is a first angle ($\alpha$), and an included angle formed between a light beam coming out from at least one side refractive surface and the bottom surface is smaller than or equal to the first angle; and a maximum included angle formed between the light beam incident from the bottom surface and to be irradiated onto the upper refractive surface and a central axis of the optical element is a second angle ($\beta$), and an included angle formed between the light beam coming out from the upper refractive surface and a central axis of the optical element is greater than or equal to the second angle, and wherein said optical element enables the energy of the emitted light to uniformly-distribute at an angle of 0~90 with respect to the central axis.

2. The optical element as claimed in claim 1, wherein the optical element and a light source are assembled into a light-emitting component, and the light source is a light-emitting diode, an incandescent lamp, or a phosphor light-emitting device.

3. The optical element as claimed in claim 2, wherein the light-emitting diode is a white light-emitting diode, an RGB single chip, or an RGB chip assembly.

4. The optical element as claimed in claim 1, wherein the bottom surface is a plane for being coupled to a light source.

5. The optical element as claimed in claim 1, wherein the bottom surface comprises a concave surface for accommodating a light source.

6. The optical element as claimed in claim 1, wherein the side refractive surface comprises a smooth aspherical surface having a downward notch.

7. The optical element as claimed in claim 1, wherein the central axis is perpendicular to the bottom surface.

8. The optical element as claimed in claim 1, wherein two adjacent side refractive surfaces are connected through a junction surface, and an extension plane of the junction surface passes through a center of the bottom surface.

9. The optical element as claimed in claim 1, wherein the upper refractive surface and a side refractive surface adjacent to the upper refractive surface are connected through a junction surface, and an extension plane of the junction surface passes through a center of the bottom surface.

10. The optical element as claimed in claim 1, wherein the optical element is a lens.

11. A direct-lit backlight module, comprising:
a plurality of light-emitting components, wherein each of the light-emitting components comprises:
a light source; and
an optical element, which comprises:
a bottom surface coupled to the light source;
at least one side refractive surface, for refracting one part of a light beam incident from the bottom surface, and
an upper refractive surface, for refracting the other part of the light beam incident from the bottom surface, wherein the upper refractive surface comprises a smooth aspherical concave surface, and the cross section of the upper refractive surface comprises a concave curve and two convex curves at both sides of the concave curve wherein a maximum included angle formed between the light beam incident from the bottom surface and to be irradiated onto the side refractive surface and the bottom surface is a first angle ($\alpha$), and an included angle formed between a light beam coming out from at least one side refractive surface and the bottom surface is smaller than or equal to the first angle; and a maximum included angle formed between the light beam incident from the bottom surface and to be irradiated onto the upper refractive surface and a central axis of the optical element is a second angle ($\beta$), and an included angle formed between the light beam coming out from the upper refractive surface and a central axis of the optical element is greater than or equal to the second angle, and wherein said optical element enables the energy of the emitted light to uniformly distribute at an angle of 0~90 with respect to the central axis.

12. The backlight module as claimed in claim 11, wherein the light source is a light-emitting diode, an incandescent lamp, and a phosphor light-emitting device.

13. The backlight module as claimed in claim 11, wherein the light-emitting diode is a white light-emitting diode, an RGB single chip, or an RGB chip assembly.

14. The backlight module as claimed in claim 11, wherein the bottom surface of the optical element is a plane for being coupled to a light source.

15. The backlight module as claimed in claim 11, wherein the bottom surface of the optical element is a concave surface for accommodating the light source.

16. The backlight module as claimed in claim 11, wherein the side refractive surface of the optical element comprises a smooth aspherical surface having a downward notch.

17. The backlight module as claimed in claim 11, wherein a central axis of the optical element is perpendicular to the bottom surface.

18. The backlight module as claimed in claim 11, wherein two adjacent side refractive surfaces are connected through a junction surface, and an extension plane of the junction surface passes through a center of the bottom surface.

19. The backlight module as claimed in claim 11, wherein the upper refractive surface and a side refractive surface adjacent to the upper refractive surface are connected through a junction surface, and an extension plane of the junction surface passes through a center of the bottom surface.

20. The backlight module as claimed in claim 11, wherein the optical element is a lens.

* * * * *